(12) United States Patent
Laizer

(10) Patent No.: US 6,907,747 B2
(45) Date of Patent: Jun. 21, 2005

(54) REFRIGERATION UNIT GUARD DEVICE

(76) Inventor: Cyril Laizer, P.O. Box 1231, Springfield, LA (US) 70462

( * ) Notice: Subject to any disclaimer, the term of this patent is extended or adjusted under 35 U.S.C. 154(b) by 181 days.

(21) Appl. No.: 10/427,156

(22) Filed: Apr. 30, 2003

(65) Prior Publication Data
US 2005/0044867 A1 Mar. 3, 2005

(51) Int. Cl.⁷ .............................................. F25B 39/04
(52) U.S. Cl. .............................. 62/239; 62/428; 62/507; 165/122; 454/254
(58) Field of Search ......................... 62/239, 244, 428, 62/429, 507, 508; 165/122, 124, 125–127; 454/83, 254

(56) References Cited

U.S. PATENT DOCUMENTS

| 4,078,395 A | | 3/1978 | Crowe | |
|---|---|---|---|---|
| 4,310,192 A | | 1/1982 | Fitzgerald | |
| 4,468,060 A | | 8/1984 | Fitzgerald | |
| 4,475,585 A | * | 10/1984 | Hoeffken | 165/134.1 |
| 4,567,734 A | | 2/1986 | Dankowski | |
| 4,736,597 A | * | 4/1988 | Anderson et al. | 62/239 |
| 4,811,569 A | * | 3/1989 | Welch et al. | 62/239 |
| 4,956,978 A | | 9/1990 | Bleck | |
| 5,388,424 A | | 2/1995 | Chopko | |
| 5,878,592 A | * | 3/1999 | Borges et al. | 62/285 |
| 6,221,120 B1 | * | 4/2001 | Bennington et al. | 55/385.1 |
| 6,357,249 B1 | * | 3/2002 | Robinson et al. | 62/285 |
| 6,692,223 B2 | * | 2/2004 | Ikeda et al. | 415/53.1 |
| 6,826,048 B1 | * | 11/2004 | Dean et al. | 361/695 |

* cited by examiner

Primary Examiner—William E. Tapolcai
(74) Attorney, Agent, or Firm—Adams & Reese LLP

(57) ABSTRACT

A guard device for an externally mounted vehicle refrigeration unit is provided, comprising an open frame assembly constructed from steel tubing, and having a mounting base, wherein the mounting base includes at least two rigid members adapted to connect to a vehicle body. The guard device includes a front airflow portion, a top access port, and a bottom access port. A front airflow panel is connected to and covers the front airflow portion. A pair of side access ports are also provided within the frame assembly, wherein each side access port is adjacent to the front airflow portion. The side access ports are each covered by reinforced side access panels.

10 Claims, 6 Drawing Sheets

REFRIGERATION UNIT GUARD DEVICE

BACKGROUND OF THE INVENTION

I. Field of the Invention

The present invention relates to vehicle refrigeration units, and more particularly to shrouds or other reinforced enclosures for protecting externally mounted vehicle refrigeration units from physical damage.

II. Prior Art

Vehicles which carry goods requiring refrigeration are often equipped with refrigeration units mounted to the top front of the trailer. These refrigeration units, sometimes referred to as "reefers" by those in the industry, benefit from their placement on the front of the vehicle, because the air flow that results during transportation serves to cool the refrigeration coils and condense the working fluid. While this particular location of the reefer provides advantageous refrigeration efficiencies, it is also the worse place for a reefer in terms of possible physical damage from low hanging tree limbs and the like.

Prior to the present invention, reefers mounted in this fashion were highly susceptible of damage. While such units are manufactured to commercial standards and operate trouble-free most of the time, they are not designed to withstand a heavy impact from a tree limb. Given the momentum of the vehicle and the stationary nature of the tree limb, the reefer often ends up absorbing much of the collision. Reefers are typically installed with a housing made of thin metal, plastic or fiberglass, but such housings are merely intended to protect the mechanical and electrical components from the elements. If a reefer is hit by a tree limb or low hanging object, the housing is often cracked or broken beyond repair, and the internal components are likewise damaged. With units of this type generally costing from $10,000 to $15,000, the replacement of a reefer unit is often an economically catastrophic event, especially for the small business owner whose services are highly dependent upon the reefer remaining intact. This situation is only exacerbated by the downtime for repair or replacement, and the possible loss of goods due to a failure to maintain the required temperature for perishable items.

Unfortunately, little has been done to address the foregoing problems. Many patents have issued for a variety of enclosures for such units, but all having the primary goal of improving the aerodynamic efficiency of the external design. For example, U.S. Pat. No. 4,310,192 to Fitzgerald discloses an aerodynamic wind deflector for a refrigerated trailer. This device appears effective for its stated purpose, and offers a hinged cover for accessing the reefer unit underneath the deflector. It also includes a grilled opening for the passage of air over the reefer unit. However, this device is preferably molded from fiberglass, which is simply not enough to protect against the damage explained above.

Similar devices are also illustrated in the following patents: U.S. Pat. No. 4,078,395 (Crowe); U.S. Pat. No. 4,468,060 (Fitzgerald); U.S. Pat. No. 4,567,734 (Dankowski); U.S. Pat. No. 5,388,424 (Chopko); U.S. Des. No. 258,233 (Taylor); and U.S. Des. No. 266,870 (Allard). Notably, none of these patents disclose the problems of tree limb and similar damage to reefer units. Moreover, none disclose or suggest a design of sufficient strength and rigidity which would minimize or eliminate such problems. Consequently, the present invention recognizes the nature and severity of the problem and directly provides a superior and innovative solution.

SUMMARY OF THE INVENTION

Therefore, one object of the present invention is to provide a refrigeration unit guard device which surrounds a reefer unit and protects it from heavy impact damage, such as that which would be likely from low hanging objects and tree limbs.

It is also an object of the present invention to provide a refrigeration unit guard device which is constructed from materials and components which impart a structural rigidity and strength to the guard device far superior to other known reefer housings and covers.

A further object of the present invention is to provide a refrigeration unit guard device which provides large open areas of access for maintenance of the reefer unit.

Still another object of the present invention is to provide a refrigeration unit guard device which includes large, reinforced side panels which may be easily removed for maintenance access to the reefer.

Yet another object of the present invention is to provide a refrigeration unit guard device whose external shape is substantially curved to allow tree limbs to glide over and past the reefer unit, thereby minimizing damage to both the reefer and the guard device.

Accordingly, a guard device for an externally mounted vehicle refrigeration unit is provided, comprising an open frame assembly having a mounting base, wherein the mounting base includes at least two rigid members adapted to connect to a vehicle body; a front airflow portion, a top access port, and a bottom access port; and a pair of side access ports, wherein each side access port is adjacent to the front airflow portion; a front airflow panel connected to and covering the front airflow portion; a pair of side access panels, wherein each side access panel is removably connected to and covering the side access ports.

Optionally, the guard device may further comprise at least one top access panel removably connected to and covering at least a portion of the top access port. Preferably, the guard device would include at least two such top access panels, wherein each top access panel is adjacent to each of the side access panels, respectively.

Also preferably, each side access panel would includes one or more reinforcing members for further protection of the unit and for ease of assembly and disassembly. Similarly, the side access panels are ideally connected to the frame assembly by a plurality of quick-release fasteners.

In a further preferred embodiment, the front airflow panel includes a plurality of apertures sufficient to permit air flow over the refrigeration unit, and could be in the form of a rigid metal grate or screen.

Preferably, the frame assembly and side access panels are constructed so as to include substantially curved transitions between the side access ports and the front airflow portion to minimize physical damage to the guard device and the enclosed unit from contact with objects striking the guard device, such as tree limbs.

Also preferably, the frame assembly includes an upper frame member and a lower frame member, and wherein the distance between the upper frame member and the lower frame member is greater than the vertical dimension of the refrigeration unit, thus completely enclosing the unit. Moreover, it is preferred that the frame assembly for the guard device be constructed from carbon steel tubing, and that the frame assembly is of sufficient structural rigidity and strength to prevent damage to the refrigeration unit upon impact with objects during transportation of the refrigerated goods.

It is among the objects of the present invention to provide a refrigeration unit guard device having the advantages and benefits set forth above and described in further detail hereinafter in this specification. While there is shown in the accompanying drawings one or more preferred embodiments of the invention, it should be understood that the same is susceptible of modification and change without departing from the spirit of the invention as claimed herein.

DETAILED DESCRIPTION OF THE PREFERRED EMBODIMENTS

Figure 1:
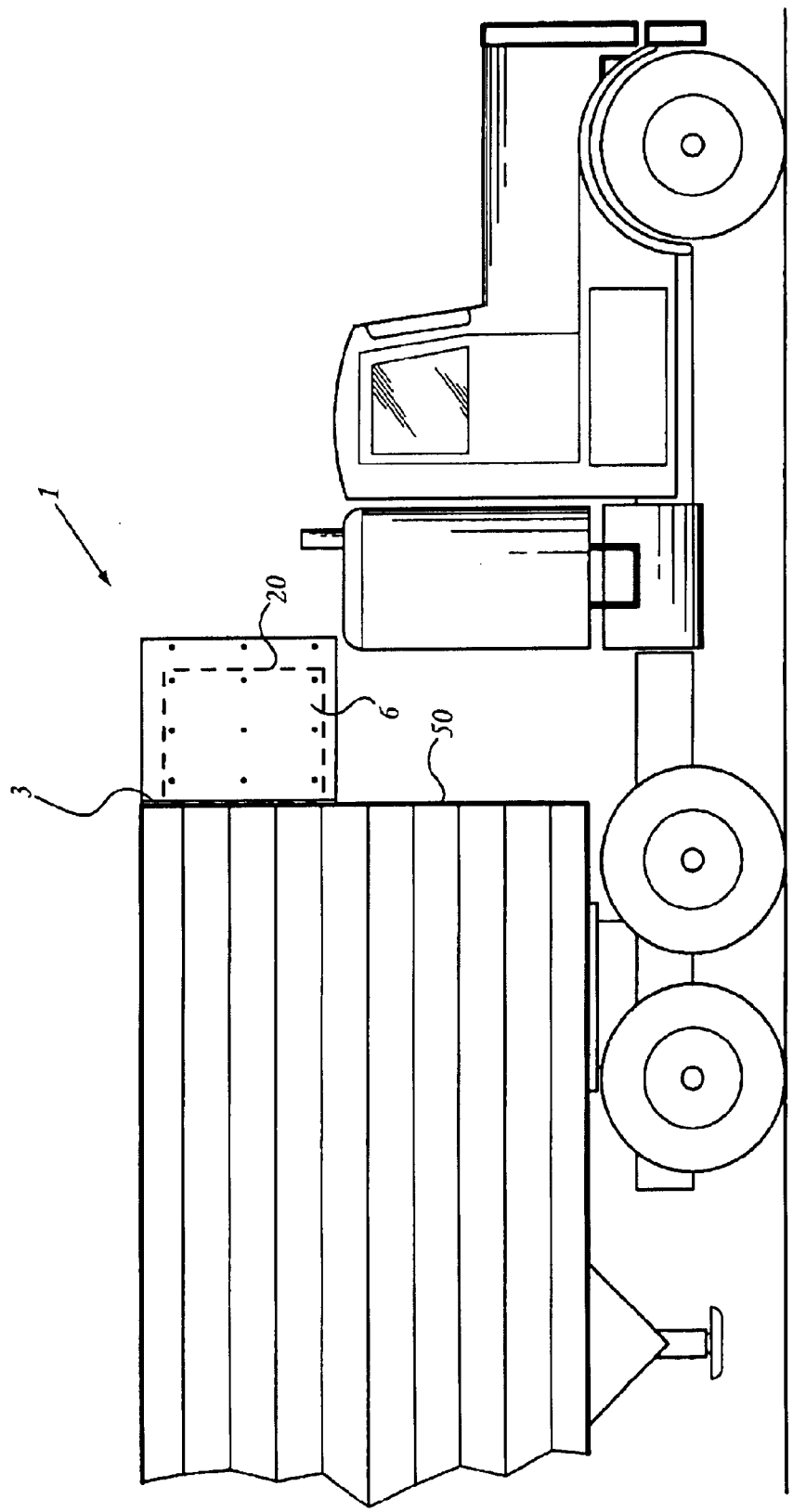
FIG. 1 is an elevation view of a vehicle showing the location of the refrigeration unit and one embodiment of the present invention.
Figure 2:
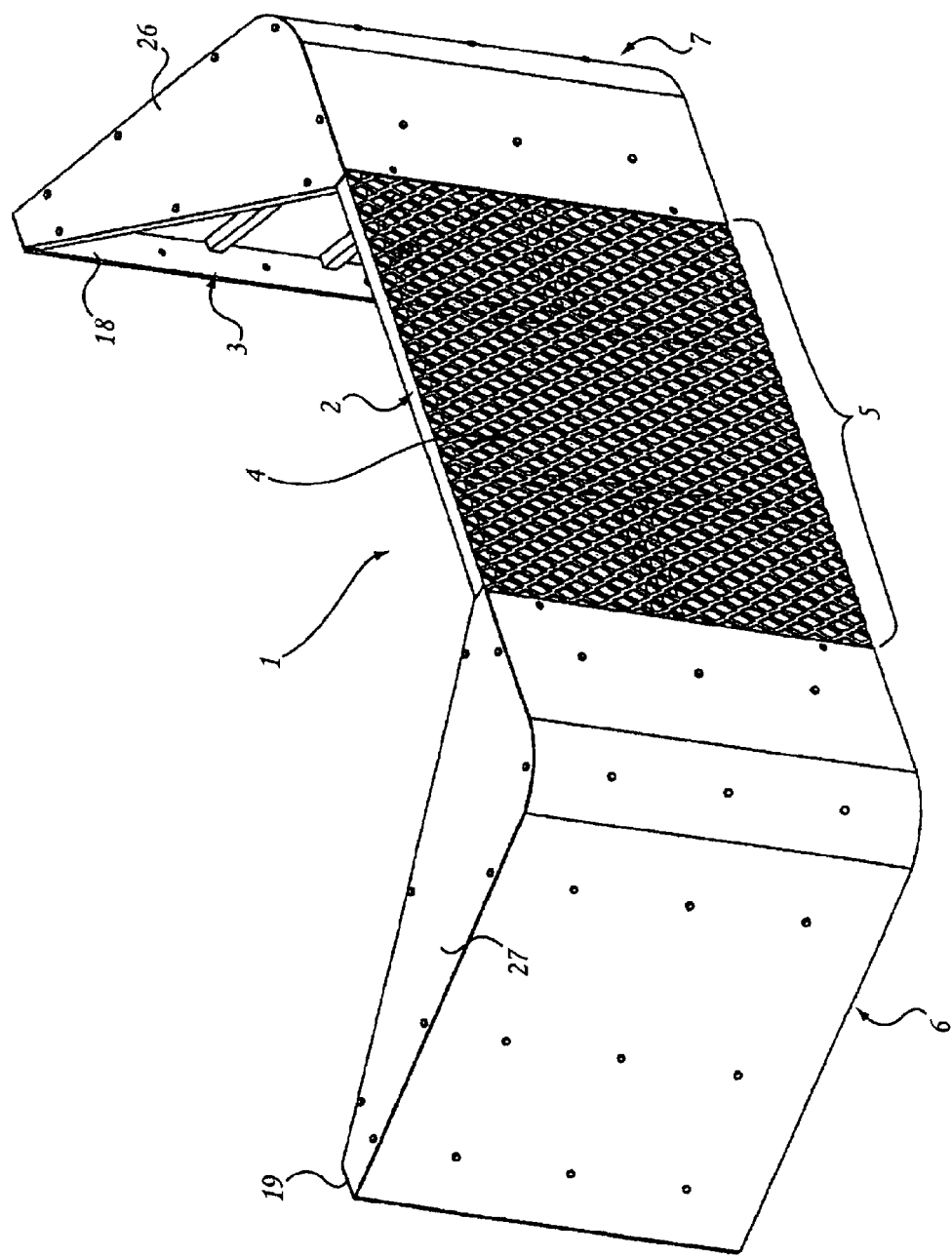
FIG. 2 is a perspective view of the front of the invention.
Figure 3:
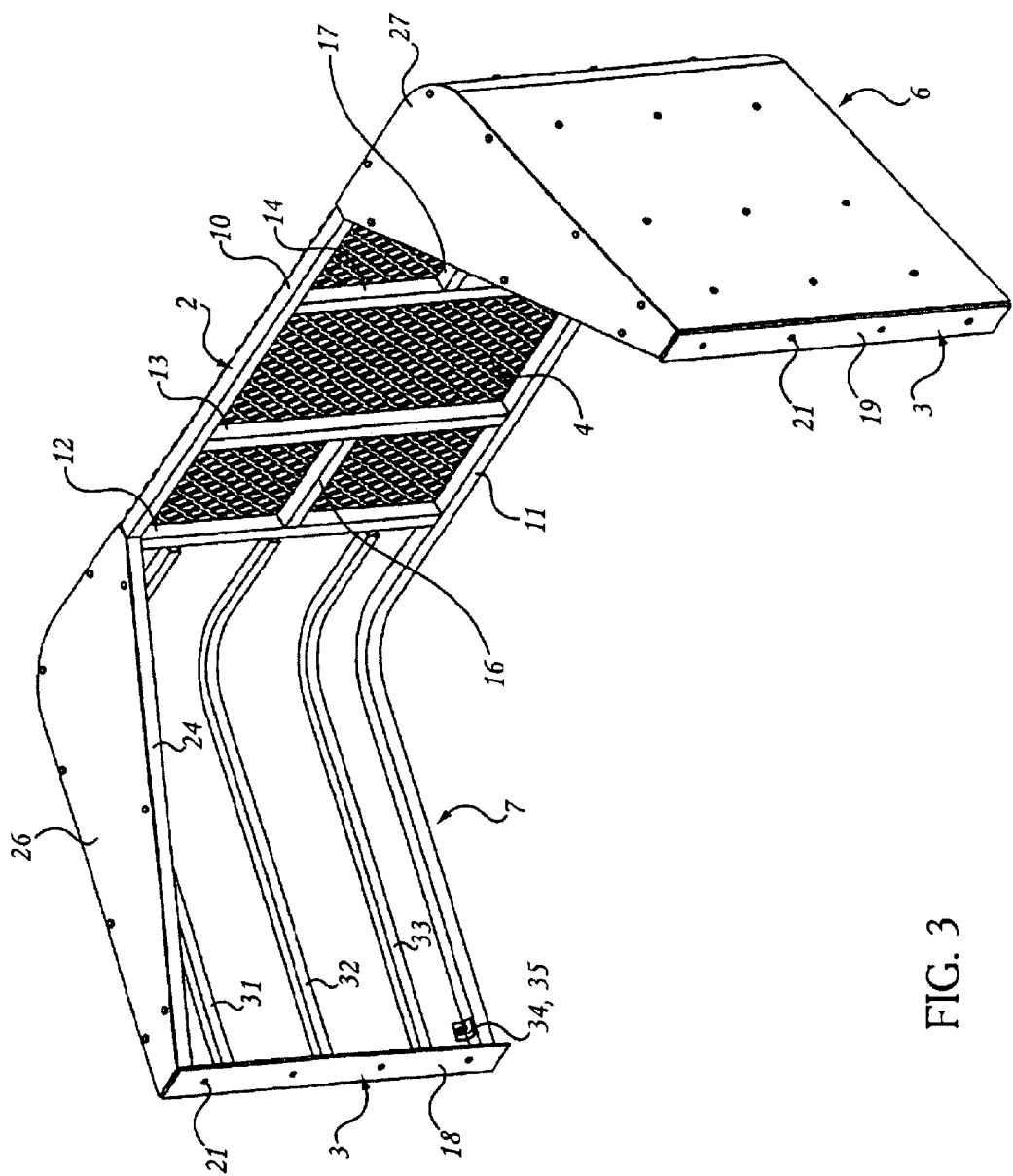
FIG. 3 is a perspective view of the rear of the invention.
Figure 4:
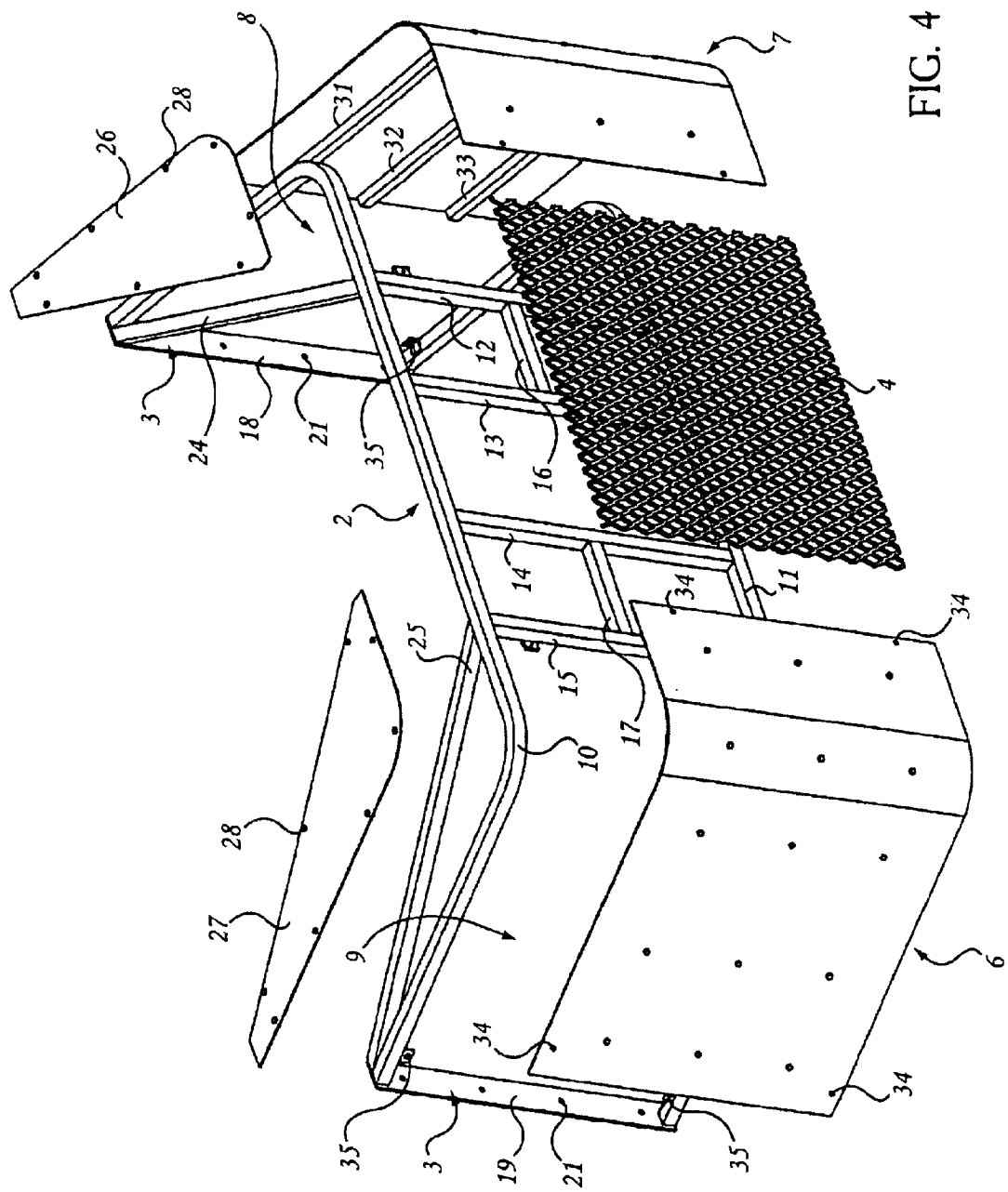
FIG. 4 is an exploded perspective view of the invention.
Figure 5:
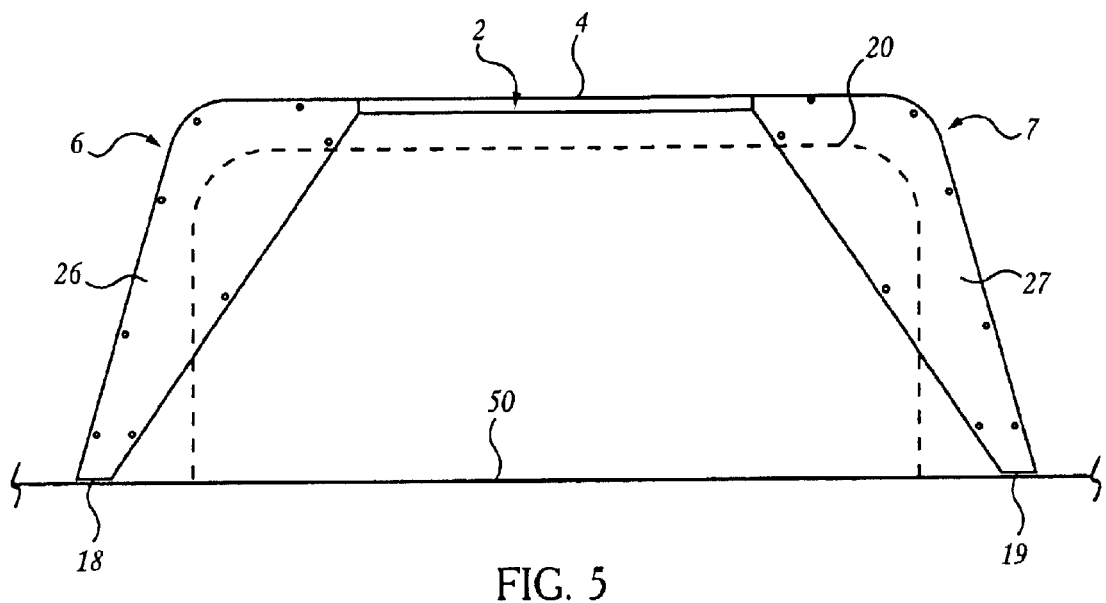
FIG. 5 is a top view of the invention.
Figure 6:
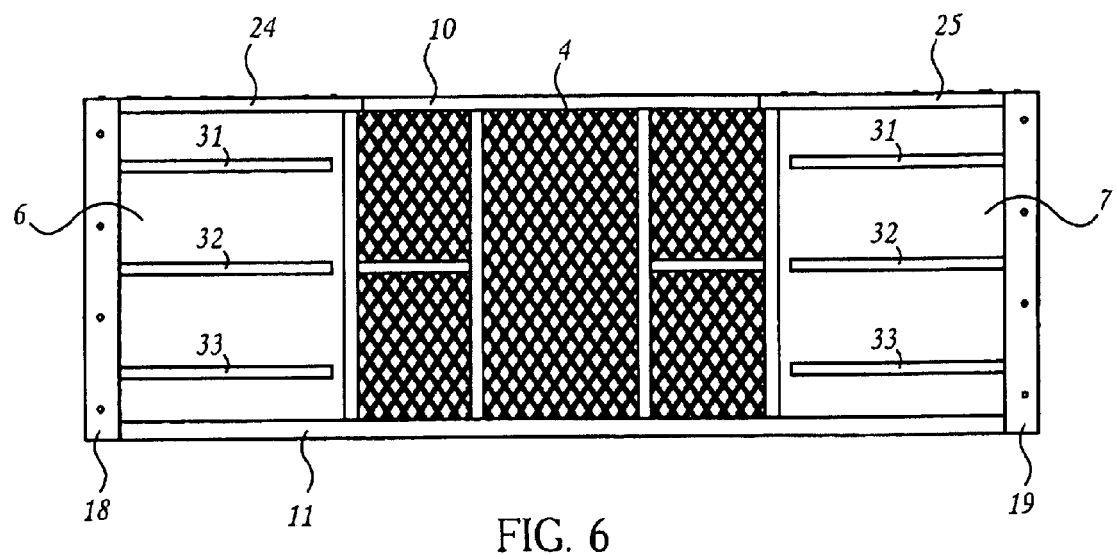
FIG. 6 is a rear view of the invention.
Figure 8:
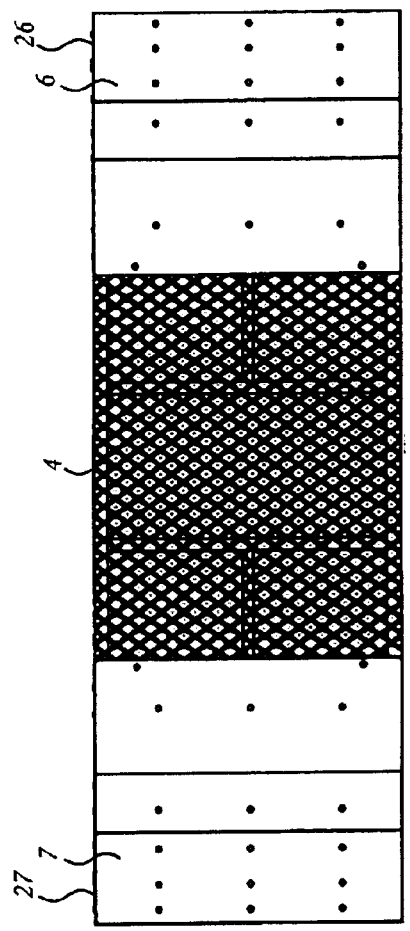
FIG. 8 is a front view of the invention.
Figure 7:
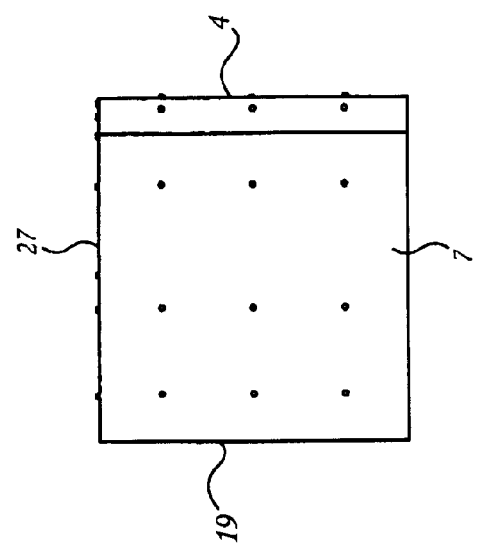
FIG. 7 is a right side view of the invention.

Turning now to the drawings, a preferred embodiment 1 of the present invention is depicted in FIGS. 1–8 as generally comprising an open frame assembly 2 having a mounting base 3, a front airflow panel 4 connected to and covering a front airflow portion 5, and a pair of side access panels 6, 7, wherein each side access panel is removably connected to and covering side access ports 8, 9. A top access port 29 and bottom access port 30 are also defined by the frame assembly 2 and its constituent structural members as further described below.

Frame assembly 2 includes an upper frame member 10 and a lower frame member 11 which are joined to one another by a series of parallel vertical support members 12–15 located generally toward the front of the guard device as shown in the figures. Although a number of methods may be employed to construct the basic frame assembly 2, it is preferred that all such members thereof are comprised of carbon steel tubing and welded to one another, unless otherwise specified herein. In a preferred embodiment, the steel tubing used has a square cross section with an outside dimension of 1.25" and a wall thickness of 0.125". Vertical support members 12, 13 and 14, 15 are further reinforced by horizontal stiffeners 16, 17, respectively. Importantly, the distance between upper frame member 10 and lower frame member 11 is greater than the vertical dimension of the reefer unit 20 enclosed. In this manner, any object striking the guard device will necessarily be pushed away from the reefer unit 20 itself.

On each side of the frame assembly 2, the terminal ends of upper and lower frame members 10, 11 are joined, preferably by welding, to vertically oriented mounting plates 18, 19. Mounting plates 18, 19 are positioned such that they may be permanently attached by bolting to the vehicle or trailer body 50 through a series of mounting holes 21.

A front airflow portion 22 is defined by the space between vertical support members 12, 15 and the upper and lower frame members 10, 11. The front airflow portion 22 is covered by a front airflow panel 4 connected to the frame assembly by welding. In a preferred embodiment, the front airflow panel 4 includes a plurality of apertures sufficient to permit air flow over the reefer unit 20, and could be in the form of a rigid metal grate or screen. For example, a typical metal screen used is 13-gauge 2"×1" expanded metal, although equivalent materials may also be suitable.

As a further measure to ensure rigidity of the guard device, top stiffeners 24, 25 are joined to the mounting plates 18, 19, respectively, from the terminal ends of upper frame member 10 to a point immediately above vertical support members 12, 15, respectively. This reinforcement arrangement also provides a convenient base for the installation of top panels 26, 27, which further prevent entry of tree branches into the enclosed space around the reefer unit 20. Top panels 26, 27 are preferably screwed into upper frame member 10 and top stiffeners 24, 25, respectively, by self-tapping hex head screws 28.

Side access ports 8, 9 are defined by the space between the mounting plates 18, 19, and the front airflow portion 5, and they provide convenient access to the reefer unit 20 for maintenance and repair purposes. During operation of the vehicle, side access ports 8, 9 are covered by side access panels 6, 7, which provide additional structural rigidity and strength to the guard device, as well as an effective protective shroud against the incursion of tree branches in the reefer unit enclosure. Each side access panel 6, 7 is preferably reinforced by side stiffeners 31–33 screwed or welded onto the inside surface of each panel, or by ridges formed as an, integral part of each side access panel 6, 7. In this manner, the entire side access panel 6, 7 can be easily installed and removed by a plurality of screws, or more preferably, by a plurality of quick release fasteners 34 connected to panel brackets 35 welded to the frame assembly 2.

Of primary importance in the foregoing assembly of components is that the guard device, through its frame assembly 2 and attached panels, be of sufficient structural rigidity and strength to prevent damage to the refrigeration unit 20 upon impact with objects during transportation of the refrigerated goods. This is a feature most notably lacking from other known covers and housings for reefer units 20 mounted in this manner.

Based upon experiences of the inventor, the reefer units which would benefit most from the present invention are those manufactured under the trademarks ThermoKing and Carrier, particularly the ThermoKing Model KDII-50SR and the Carrier Model Supra 922. However, a number of other makes and models would derive similar utility from the advantages and features described and claimed herein.

Although exemplary embodiments of the present invention have been shown and described, many changes, modifications, and substitutions may be made by one having ordinary skill in the art without necessarily departing from the spirit and scope of the invention.

I claim:

1. A guard device for an externally mounted vehicle refrigeration unit, wherein said refrigeration unit has a predetermined vertical dimension, comprising:
    (a) an open frame assembly having:
        (i) a mounting base, wherein said mounting base includes at least two rigid members adapted to connect to a vehicle body;
        (ii) a front airflow portion;
        (iii) a top access port, and a bottom access port; and
        (iv) a pair of side access ports, wherein each said side access port is adjacent to said front airflow portion;
    (b) a front airflow panel removably connected to and covering said front airflow portion;
    (c) a pair of side access panels, wherein each said side access panel is removably connected to and covering said side access ports.

2. The guard device of claim 1, further comprising at least one top access panel removably connected to and covering at least a portion of said top access port.

3. The guard device of claim 1, further comprising at least two top access panels removably connected to and covering at least a portion of said top access port, wherein each said top access panel is adjacent to each of said side access panels, respectively.

4. The guard device of claim 1, wherein each said side access panels includes one or more reinforcing members.

5. The guard device of claim 1, wherein each said side access panel is connected to said frame assembly by a plurality of quick-release fasteners.

6. The guard device of claim 1, wherein said front airflow panel includes a plurality of apertures sufficient to permit air flow over said refrigeration unit.

7. The guard device of claim 1, wherein said frame assembly and said side access panels are constructed so as to include substantially curved transitions between said side access ports and said front airflow portion to minimize physical damage to said guard device from contact with objects striking said guard device.

8. The guard device of claim 1, wherein said frame assembly includes an upper frame member and a lower frame member, and wherein the distance between said upper frame member and said lower frame member is greater than the vertical dimension of said refrigeration unit.

9. The guard device of claim 1, wherein said frame assembly is constructed from carbon steel tubing.

10. The guard device of claim 1, wherein said frame assembly is of sufficient structural rigidity and strength to prevent damage to said refrigeration unit.

* * * * *